(12) United States Patent
Sakharnykh et al.

(10) Patent No.: US 9,418,400 B2
(45) Date of Patent: Aug. 16, 2016

(54) METHOD AND SYSTEM FOR RENDERING SIMULATED DEPTH-OF-FIELD VISUAL EFFECT

(71) Applicant: NVIDIA Corporation, Santa Clara, CA (US)

(72) Inventors: Nikolay Sakharnykh, San Jose, CA (US); Holger Gruen, Peissenberg (DE)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 13/921,161

(22) Filed: Jun. 18, 2013

(65) Prior Publication Data

US 2014/0368494 A1    Dec. 18, 2014

(51) Int. Cl.
*G06K 9/40* (2006.01)
*G06T 5/00* (2006.01)
*G06T 5/10* (2006.01)

(52) U.S. Cl.
CPC . *G06T 5/00* (2013.01); *G06T 5/004* (2013.01); *G06T 5/10* (2013.01); *G06T 2200/21* (2013.01); *G06T 2207/20056* (2013.01)

(58) Field of Classification Search
CPC .......... G06T 15/00; G06T 5/001; G06T 5/40; G06T 5/20; G06T 5/004; G03B 17/02; H04N 5/228; H04N 1/4092; G06F 17/156; G06F 17/15
See application file for complete search history.

(56) References Cited

U.S. PATENT DOCUMENTS

| | | | |
|---|---|---|---|
| 3,904,818 A | | 9/1975 | Kovac |
| 4,253,120 A | | 2/1981 | Levine |
| 4,633,504 A | * | 12/1986 | Wihl .............................. 382/144 |
| 4,685,071 A | | 8/1987 | Lee |
| 4,739,495 A | | 4/1988 | Levine |
| 4,771,470 A | | 9/1988 | Geiser et al. |
| 4,920,428 A | | 4/1990 | Lin et al. |
| 4,958,305 A | | 9/1990 | Piazza |
| 4,987,496 A | | 1/1991 | Greivenkamp, Jr. |
| 5,043,921 A | | 8/1991 | Gonzalez-Lopez et al. |

(Continued)

FOREIGN PATENT DOCUMENTS

EP    1449169    5/2003
EP    1378790    7/2004

(Continued)

OTHER PUBLICATIONS

Donald D. Spencer, "Illustrated Computer Graphics Dictionary", 1993, Camelot Publishing Company, p. 272.

(Continued)

*Primary Examiner* — Amir Alavi

(57) ABSTRACT

Systems and methods for rendering depth-of-field visual effect on images with high computing efficiency and performance. A diffusion blurring process and a Fast Fourier Transform (FFT)-based convolution are combined to achieve high-fidelity depth-of-field visual effect with Bokeh spots in real-time applications. The brightest regions in the background of an original image are enhanced with Bokeh effect by virtue of FFT convolution with a convolution kernel. A diffusion solver can be used to blur the background of the original image. By blending the Bokeh spots with the image with gradually blurred background, a resultant image can present an enhanced depth-of-field visual effect. The FFT-based convolution can be computed with multi-threaded parallelism.

20 Claims, 13 Drawing Sheets

(56) References Cited

U.S. PATENT DOCUMENTS

| | | | |
|---|---|---|---|
| 5,175,430 | A | 12/1992 | Enke et al. |
| 5,369,741 | A | 11/1994 | Hartog et al. |
| 5,387,983 | A | 2/1995 | Sugiura et al. |
| 5,513,016 | A | 4/1996 | Inoue |
| 5,535,291 | A * | 7/1996 | Spencer et al. ............... 382/254 |
| 5,583,974 | A | 12/1996 | Winner et al. |
| 5,596,686 | A | 1/1997 | Duluk, Jr. |
| 5,608,824 | A | 3/1997 | Shimizu et al. |
| 5,694,143 | A | 12/1997 | Fielder et al. |
| 5,751,291 | A | 5/1998 | Olsen et al. |
| 5,761,400 | A | 6/1998 | Derby et al. |
| 5,793,433 | A | 8/1998 | Kim et al. |
| 5,905,530 | A | 5/1999 | Yokota et al. |
| 5,909,595 | A | 6/1999 | Rosenthal et al. |
| 5,914,721 | A | 6/1999 | Lim |
| 5,949,914 | A * | 9/1999 | Yuen ............................ 382/254 |
| 5,990,904 | A | 11/1999 | Griffin |
| 6,016,474 | A | 1/2000 | Kim et al. |
| 6,046,746 | A | 4/2000 | Deering |
| 6,052,128 | A | 4/2000 | Narayanaswami et al. |
| 6,052,129 | A | 4/2000 | Fowler et al. |
| 6,091,428 | A | 7/2000 | Piazza et al. |
| 6,094,200 | A | 7/2000 | Olsen et al. |
| 6,118,547 | A | 9/2000 | Tanioka |
| 6,141,740 | A | 10/2000 | Mahalingaiah et al. |
| 6,151,457 | A | 11/2000 | Kawamoto |
| 6,172,670 | B1 | 1/2001 | Oka et al. |
| 6,246,415 | B1 | 6/2001 | Grossman et al. |
| 6,252,611 | B1 | 6/2001 | Kondo |
| 6,289,103 | B1 | 9/2001 | Sako et al. |
| 6,314,493 | B1 | 11/2001 | Luick |
| 6,319,682 | B1 | 11/2001 | Hochman |
| 6,323,860 | B1 | 11/2001 | Zhu et al. |
| 6,373,485 | B2 | 4/2002 | Sowizral et al. |
| 6,396,397 | B1 | 5/2002 | Bos et al. |
| 6,407,741 | B1 | 6/2002 | Morein et al. |
| 6,438,664 | B1 | 8/2002 | McGrath et al. |
| 6,445,390 | B1 | 9/2002 | Aftosmis et al. |
| 6,476,807 | B1 | 11/2002 | Duluk, Jr. et al. |
| 6,480,205 | B1 | 11/2002 | Greene et al. |
| 6,486,971 | B1 | 11/2002 | Kawamoto |
| 6,504,952 | B1 | 1/2003 | Takemura et al. |
| 6,525,726 | B1 | 2/2003 | Xie et al. |
| 6,584,202 | B1 | 6/2003 | Montag et al. |
| 6,594,388 | B1 | 7/2003 | Gindele et al. |
| 6,630,933 | B1 | 10/2003 | Van Hook |
| 6,636,212 | B1 | 10/2003 | Zhu |
| 6,636,215 | B1 | 10/2003 | Greene |
| 6,646,639 | B1 | 11/2003 | Greene et al. |
| 6,677,945 | B2 | 1/2004 | Lapidous et al. |
| 6,683,643 | B1 | 1/2004 | Takayama et al. |
| 6,717,576 | B1 | 4/2004 | Duluk et al. |
| 6,720,964 | B1 | 4/2004 | Fowler et al. |
| 6,737,625 | B2 | 5/2004 | Baharav et al. |
| 6,785,814 | B1 | 8/2004 | Usami et al. |
| 6,806,452 | B2 | 10/2004 | Bos et al. |
| 6,839,062 | B2 | 1/2005 | Aronson et al. |
| 6,862,025 | B2 | 3/2005 | Buehler |
| 6,891,543 | B2 | 5/2005 | Wyatt |
| 6,900,800 | B2 | 5/2005 | Baldwin |
| 6,900,836 | B2 | 5/2005 | Hamilton, Jr. |
| 6,924,801 | B1 | 8/2005 | Dorbie |
| 7,015,909 | B1 | 3/2006 | Morgan, III et al. |
| 7,030,877 | B1 | 4/2006 | Sell |
| 7,091,971 | B2 | 8/2006 | Morein |
| 7,091,973 | B1 | 8/2006 | Cohen |
| 7,092,018 | B1 | 8/2006 | Watanabe |
| 7,133,072 | B2 | 11/2006 | Harada |
| 7,146,041 | B2 | 12/2006 | Takahashi |
| 7,218,317 | B2 | 5/2007 | Liao et al. |
| 7,221,779 | B2 | 5/2007 | Kawakami et al. |
| 7,227,586 | B2 | 6/2007 | Finlayson et al. |
| 7,242,400 | B2 | 7/2007 | Van Hook et al. |
| 7,245,319 | B1 | 7/2007 | Enomoto |
| 7,580,070 | B2 | 8/2009 | Yanof et al. |
| 7,627,193 | B2 | 12/2009 | Alon et al. |
| 7,728,880 | B2 | 6/2010 | Hung et al. |
| 7,750,956 | B2 | 7/2010 | Wloka |
| 7,912,279 | B2 | 3/2011 | Hsu et al. |
| 8,049,789 | B2 | 11/2011 | Innocent |
| 8,269,769 | B1 | 9/2012 | Voorhies et al. |
| 8,390,619 | B1 | 3/2013 | Voorhies et al. |
| 8,854,364 | B1 | 10/2014 | Voorhies |
| 8,867,857 | B2 * | 10/2014 | Santos et al. ................ 382/255 |
| 2001/0012113 | A1 | 8/2001 | Yoshizawa et al. |
| 2001/0012127 | A1 | 8/2001 | Fukuda et al. |
| 2001/0015821 | A1 | 8/2001 | Namizuka et al. |
| 2001/0019429 | A1 | 9/2001 | Oteki et al. |
| 2001/0021278 | A1 | 9/2001 | Fukuda et al. |
| 2001/0050778 | A1 | 12/2001 | Fukuda et al. |
| 2001/0054126 | A1 | 12/2001 | Fukuda et al. |
| 2002/0012131 | A1 | 1/2002 | Oteki et al. |
| 2002/0015111 | A1 | 2/2002 | Harada |
| 2002/0018244 | A1 | 2/2002 | Namizuka et al. |
| 2002/0027670 | A1 | 3/2002 | Takahashi et al. |
| 2002/0033887 | A1 | 3/2002 | Hieda et al. |
| 2002/0054374 | A1 | 5/2002 | Inoue et al. |
| 2002/0105579 | A1 | 8/2002 | Levine et al. |
| 2002/0126210 | A1 | 9/2002 | Shinohara et al. |
| 2002/0146136 | A1 | 10/2002 | Carter, Jr. |
| 2002/0149683 | A1 | 10/2002 | Post |
| 2002/0191694 | A1 | 12/2002 | Ohyama et al. |
| 2002/0196470 | A1 | 12/2002 | Kawamoto et al. |
| 2003/0122825 | A1 | 7/2003 | Kawamoto |
| 2003/0142222 | A1 | 7/2003 | Hordley |
| 2003/0146975 | A1 | 8/2003 | Joung et al. |
| 2003/0169918 | A1 | 9/2003 | Sogawa |
| 2003/0222995 | A1 | 12/2003 | Kaplinsky et al. |
| 2003/0223007 | A1 | 12/2003 | Takane |
| 2004/0032516 | A1 | 2/2004 | Kakarala |
| 2004/0066970 | A1 | 4/2004 | Matsugu |
| 2004/0100588 | A1 | 5/2004 | Hartson et al. |
| 2005/0007378 | A1 | 1/2005 | Grove |
| 2005/0007477 | A1 | 1/2005 | Ahiska |
| 2005/0030395 | A1 | 2/2005 | Hattori |
| 2005/0185058 | A1 | 8/2005 | Sablak |
| 2005/0243181 | A1 | 11/2005 | Castello et al. |
| 2005/0248671 | A1 | 11/2005 | Schweng |
| 2005/0286097 | A1 | 12/2005 | Hung et al. |
| 2006/0050158 | A1 | 3/2006 | Irie |
| 2006/0061658 | A1 | 3/2006 | Faulkner et al. |
| 2006/0274171 | A1 | 12/2006 | Wang |
| 2006/0290794 | A1 | 12/2006 | Bergman et al. |
| 2006/0293089 | A1 | 12/2006 | Herberger et al. |
| 2007/0171288 | A1 | 7/2007 | Inoue et al. |
| 2007/0285530 | A1 | 12/2007 | Kim et al. |
| 2008/0062164 | A1 | 3/2008 | Bassi et al. |
| 2008/0101690 | A1 | 5/2008 | Hsu et al. |
| 2008/0143844 | A1 | 6/2008 | Innocent |
| 2008/0170124 | A1 * | 7/2008 | Hatanaka et al. .......... 348/208.4 |
| 2009/0257677 | A1 | 10/2009 | Cabral et al. |
| 2010/0266201 | A1 | 10/2010 | Cabral et al. |
| 2014/0368494 | A1 * | 12/2014 | Sakharnykh et al. ......... 345/419 |

FOREIGN PATENT DOCUMENTS

| | | |
|---|---|---|
| JP | 61187467 | 8/1986 |
| JP | 62151978 | 7/1987 |
| JP | 07015631 | 1/1995 |
| JP | 2001052194 | 2/2001 |
| JP | 2005094048 | 4/2005 |
| JP | 2005520442 | 7/2005 |
| JP | 2006086822 | 3/2006 |
| JP | 2006121612 | 5/2006 |
| JP | 2006134157 | 5/2006 |
| JP | 2007019959 | 1/2007 |
| JP | 2007282158 | 10/2007 |
| JP | 2008085388 | 4/2008 |
| JP | 2008277926 | 11/2008 |
| JP | 2009021962 | 1/2009 |
| KR | 1020040043156 | 5/2004 |

(56) References Cited

FOREIGN PATENT DOCUMENTS

| WO | 2004063989 | 7/2004 |
|---|---|---|
| WO | 2007056459 | 5/2007 |

OTHER PUBLICATIONS

Duca et al., "A Relational Debugging Engine for Graphics Pipeline, International Conference on Computer Graphics and Interactive Techniques", ACM SIGGRAPH Jul. 2005, pp. 453-463.

gDEBugger, graphicRemedy, http://www.gremedy.com, Aug. 8, 2006, pp. 1-18.

Ko et al., "Fast Digital Image Stabilizer Based on Gray-Coded Bit-Plane Matching", IEEE Transactions on Consumer Electronics, vol. 45, No. 3, pp. 598-603, Aug. 1999.

Ko, et al., "Digital Image Stabilizing Algorithms Basd on Bit-Plane Matching", IEEE Transactions on Consumer Electronics, vol. 44, No. 3, pp. 617-622, Aug. 1988.

Morimoto et al., "Fast Electronic Digital Image Stabilization for Off-Road Navigation", Computer Vision Laboratory, Center for Automated Research University of Maryland, Real-Time Imaging, vol. 2, pp. 285-296, 1996.

Paik et al., "An Adaptive Motion Decision system for Digital Image Stabilizer Based on Edge Pattern Matching", IEEE Transactions on Consumer Electronics, vol. 38, No. 3, pp. 607-616, Aug. 1992.

Parhami, Computer Arithmetic, Oxford University Press, Jun. 2000, pp. 413-418.

S. Erturk, "Digital Image Stabilization with Sub-Image Phase Correlation Based Global Motion Estimation", IEEE Transactions on Consumer Electronics, vol. 49, No. 4, pp. 1320-1325, Nov. 2003.

S. Erturk, "Real-Time Digital Image Stabilization Using Kalman Filters", http://www,ideallibrary.com, Real-Time Imaging 8, pp. 317-328, 2002.

Uomori et al., "Automatic Image Stabilizing System by Full-Digital Signal Processing", vol. 36, No. 3, pp. 510-519, Aug. 1990.

Uomori et al., "Electronic Image Stabiliztion System For Video Cameras And VCRS", J. Soc. Motion Pict. Telev. Eng., vol. 101, pp. 66-75, 1992.

Weerasinghe et al.; "Method of Color Interpolation In A Single Sensor Color Camera Using Green Channel Separation"; Visual Information Proessing lab, Motorola Australian Research Center; IV 3233-IV3236, 2002.

Hegeman, Kyle et al. "Approximate Ambient Occlusion for Trees" Mar. 2006 ACM pp. 87-91.

Kontkanen, Janne et al. "Ambient Occlusion Fields" Apr. 2005 ACM pp. 41-47.

M. Meibner, D. Bartz, and R. Gunther and W. Straber, "Visibility Driven Rasterization", 2001, Computer Graphics Forum, vol. 20 No. 4, p. 283-294.

Shanmugam, Perumaal et al. "Hardware Accelerated Ambient Occlusion Techniques on GPUs" Apr. 2007 ACM pp. 73-79.

* cited by examiner $$\frac{\partial u}{\partial t} = \nabla \cdot (\beta \cdot \nabla u)$$

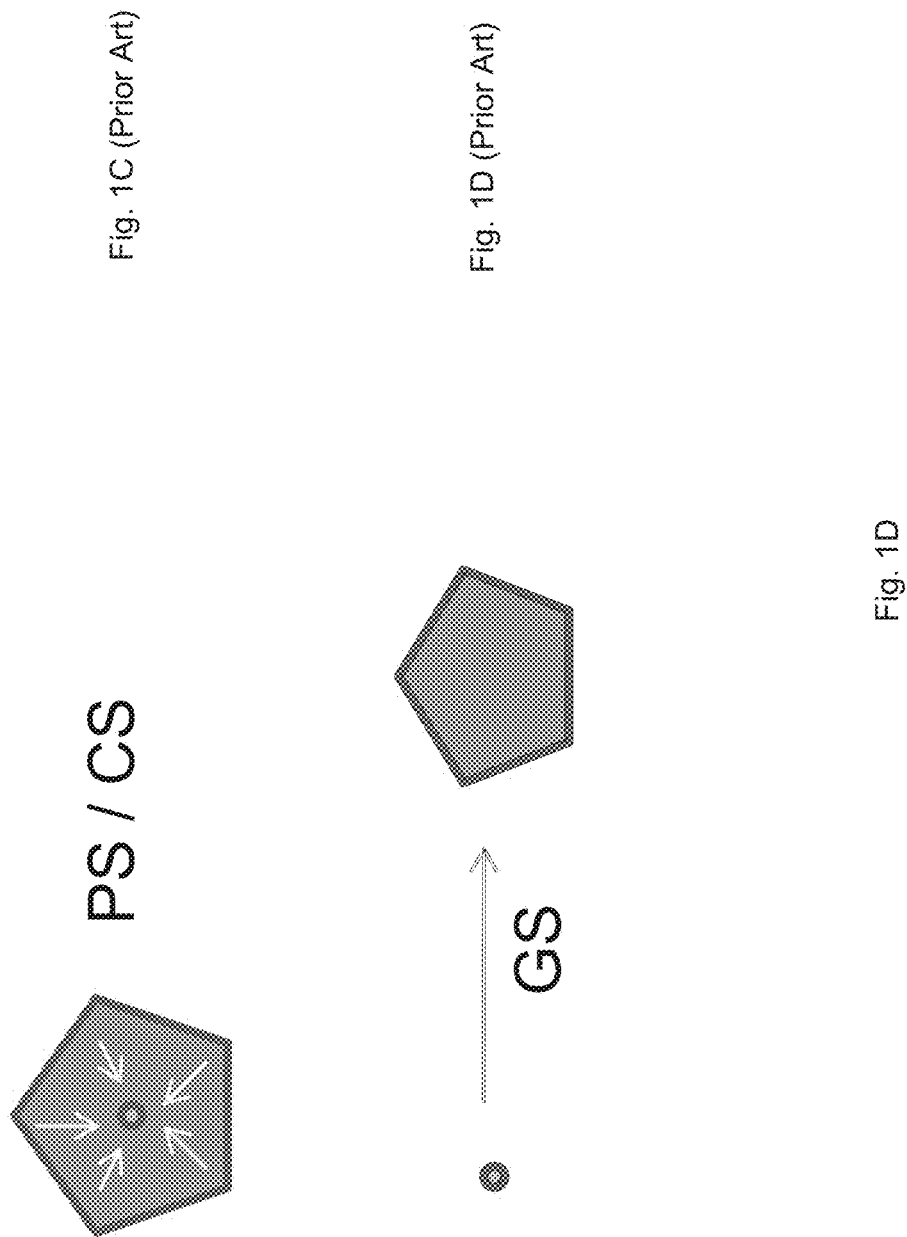

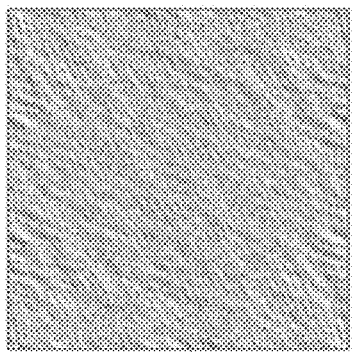
Fig. 5A
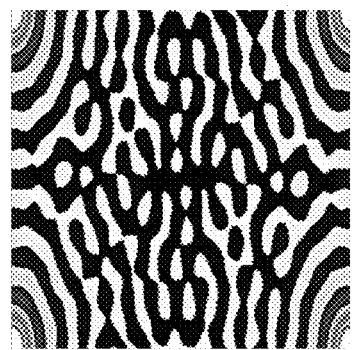
Fig. 5B
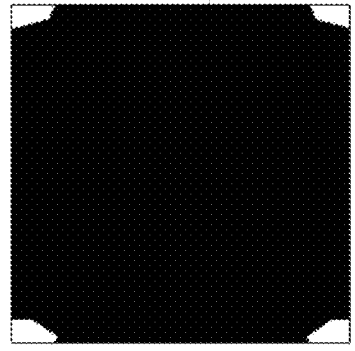

image

× kernel
= result

METHOD AND SYSTEM FOR RENDERING SIMULATED DEPTH-OF-FIELD VISUAL EFFECT

TECHNICAL FIELD

The present disclosure relates generally to the field of computer graphics, and, more specifically, to the field of image processing.

BACKGROUND

In optics, depth of field (DOF) refers to the distance between the nearest and farthest objects in a viewing window that appear acceptably sharp in an image in a video game, movie or a photograph for example. The DOF effect can be simulated in computer graphics, e.g. based on a blur algorithm. Control over depth of field is an important artistic tool that can be used to emphasize the subject of an image.

Using diffusion equations to compute blurred image became quite popular with the development of computational power of graphic processors. The diffusion method simulates color distribution in an original image with varying blur radii as a function of the depth. This is typically done using an analogy of temperature field distribution on a 2D plate with non-uniform conductivity. FIG. 1A shows a diffusion equation that can be used to simulate DOF effect in accordance with the prior art. In such a simulation, equations may be discretized and solved using an alternating direction implicit (ADI) method in a single time step. The main property of diffusion approaches is that they can respect edges and depth discontinuity in the scene at the same time using varying filter size for blurring.

In real life, DOF blur naturally comes from a camera aperture which usually has a polygon shape. The polygon shape blur with emphasized bright features are referred to as a "Bokeh effect." FIG. 1B illustrates the Bokeh effect created by a camera in a photograph. The hexagons bright spots in the background render the Bokeh effect in the photograph. In general, Gaussian-like blur operates well for averaging a scene with no brightness spikes. The Bokeh effect becomes almost a standard process in realistic image processing due to its natural presence in movies. So this is an important feature which needs to be addressed in almost any realistic looking depth-of-field technique. However, due to their inherent limitations, diffusion equations alone can only produce Gaussian-life blur that lacks a polygon shape or selectively highlighted bright spots in the image. In other words, diffusion equations do not produce good quality Bokeh effect objects in image processing.

Other DOF techniques include convolutions based on gather DOF algorithms and scatter DOF algorithms. FIG. 1C illustrates the principle of using gather algorithms to produce DOF effects in accordance with the prior art. Such algorithms generally involve computing the final color by performing convolution with a filter kernel featuring a size determined by the circle of confusion (CoC) and a shape of a polygon. FIG. 1D illustrates the principle of using scatter algorithms to produce DOF effects with a polygon filter in accordance with the prior art. The scatter algorithms involve setting up a quad with the Bokeh texture and rendering the quad with additive blending.

In the context of computer games or other application programs that often call for real-time image or video processing, computing efficiency and performance are important factors contributing to high quality visual effects.

Fast Fourier Transform (FFT)-based convolution is an important tool for generating fixed kernel shape blurs of the image. Graphic processors are very suitable for FFT and there are many efficient implementations of FFT using different application program interfaces (APIs). In general FFT blurs are much faster than their alternatives that are based on gather or scatter algorithms. However it's applications in depth-of-field effect techniques are underdeveloped due to restriction on the fixed kernel shape.

SUMMARY OF THE INVENTION

It would be advantageous to provide a computer implemented method of rendering high quality depth-of-field visual effect to images in real-time with high computing efficiency and performance. Accordingly, embodiments of the present disclosure exploit a hybrid approach that combines a diffusion blurring process and a Fast Fourier Transform (FFT)-based convolution to achieve high-fidelity depth-of-field visual effects. The brightest regions in the background of an original image are enhanced with a Bokeh effect by virtue of FFT convolution with a convolution kernel. In addition, a diffusion solver can be used to blur the background of the original image. By blending the Bokeh spots with the image with blurred background, a resultant image is rendered with an enhanced depth-of-field visual effect. The convolution kernel can be selected based on a desired geometric shape (of the aperture) that resembles the Bokeh spots generated by the optical system in a camera. Preferably, the FFT-based convolution can be computed with multi-threaded parallelism in a graphic processor having multiple programmable parallel processors.

In one embodiment of present disclosure, a computer implemented method of rendering an image comprises: (1) accessing a first image having first section and a second section; (2) applying a blur operator on the second section to generate a second image; (3) identifying a plurality of target regions from the second section in the first image; (4) converting the plurality of target regions from the space domain to a frequency domain by performing a convolution thereon; (5) restoring the plurality of target regions in the first image from the frequency domain to the space domain to produce a third image; and (6) blending the second image and the third image to produce a resultant image. The blur operator may comprise a diffusion depth-of-field solver. The convolution may comprise an FFT convolution performed on a convolution kernel with the plurality of target regions. The convolution kernel may represent the geometric shape of a camera aperture and have a size equal to the circle of confusion at an infinite distance. The convolution may be performed in parallel by multiple execution thread. The plurality of target regions may correspond to brightest regions in the second section.

In another embodiment of present disclosure, a non-transient computer readable storage medium comprises executable instructions that implement a method of rendering an image comprising: (1) accessing a first image; (2) identifying a first portion and a second portion of the first image; (3) selecting a plurality of regions from the second portion of the first image, the plurality of regions comprising luminous regions on the first image; (4) performing a Fast Fourier Transform (FFT) convolution on the plurality of regions with a convolution kernel representing a geometric shape; and (5) performing an inverse FFT convolution on the plurality of regions to produce a second image. The method may further comprise: (1) applying a diffusion depth-of-field solver to the second portion of the first image and preserving the first portion of the first image to produce a third image; and (2) combining the second image and the third image to produce an output image, wherein the output image comprises components with Bokeh effect.

In another embodiment of present disclosure, a system comprises a processor, a memory, and an image processing program stored in the memory. The image processing program comprises instructions to perform a method of: (1) accessing a first image; (2) identify a first portion and a second portion of the first image; (3) selecting a plurality of luminous regions from the second portion of the first image; (4) performing an FFT convolution on the plurality of regions with a convolution kernel representing a geometric shape to produce an intermediate image; and (5) performing an inverse FFT convolution on the intermediate image to produce a second image; (6) applying a blur operator on the second portion of the first image and preserving the first portion to produce a third image; and (7) combining the second image and the third image to produce a resultant image.

This summary contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying drawing figures in which like reference characters designate like elements and in which:

FIG. 1C illustrates the principle of using gather algorithms to produce DOF effect in accordance with the prior art.

FIG. 1D illustrates the principle of using scatter algorithms to produce DOF effect with a polygon filter in accordance with the prior art.

FIG. 5A illustrates that an exemplary forward FFT transforms a filtered image from a space domain to a frequency domain.

FIG. 5B illustrates that the forward FFT transforms a polygon from a space domain to a frequency domain which is then used as the convolution kernel.

DETAILED DESCRIPTION

Figures 1A, 1B:
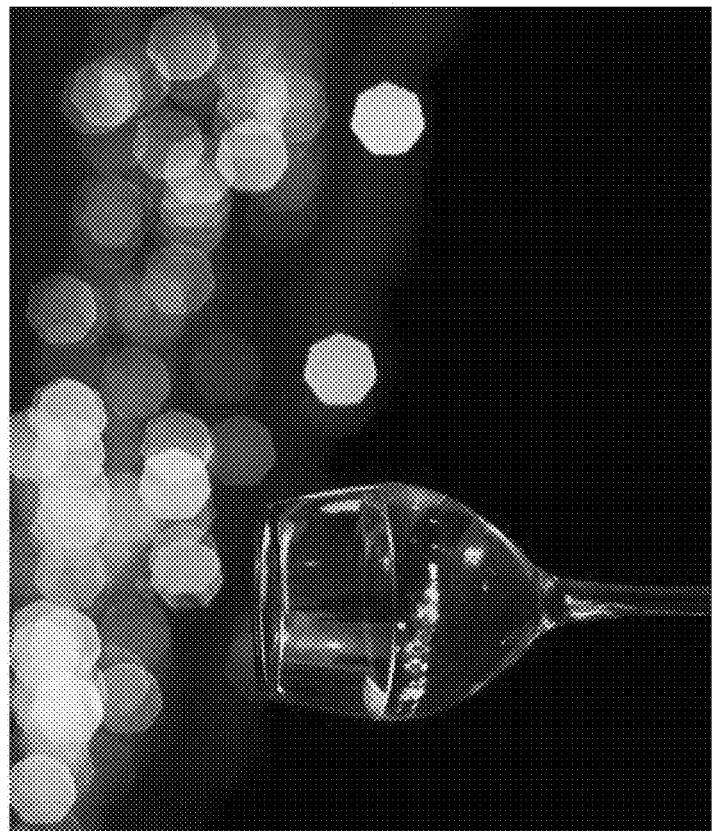
FIG. 1A shows a typical diffusion equation that can be used to simulate DOF effect in accordance with the prior art.
FIG. 1B illustrates the Bokeh effect created by a camera in a photograph.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

NOTATION AND NOMENCLATURE

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or display devices. When a component appears in several embodiments, the use of the same reference numeral signifies that the component is the same component as illustrated in the original embodiment.

Method and System for Rendering Simulated Depth-of-Field Visual Effect

Figure 2:
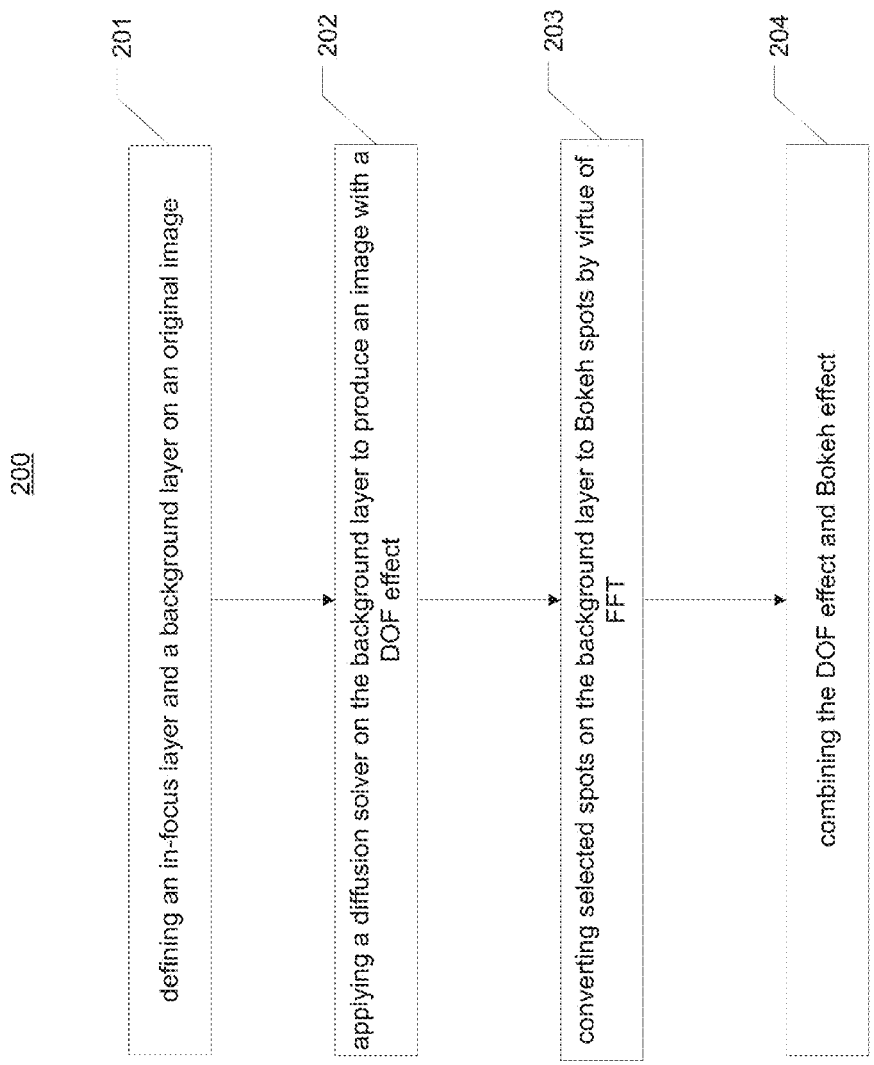
FIG. 2 is a flow chart depicting an exemplary computer implemented method of creating enhanced depth-of-focus visual effect on an original image using the hybrid approach in accordance with an embodiment of the present disclosure

FIG. 2 is a flow chart depicting an exemplary computer implemented method 200 of creating comprehensive depth-of-focus visual effect on an original image using the hybrid approach in accordance with an embodiment of the present disclosure. At 201, an in-focus layer and a background layer (or an out-of-focus layer) are first identified on an original image. At 202, a blur operator can be performed on the background layer of the image, resulting in a gradually blurred background to achieve a depth-of-focus effect in the image. At 203, a plurality of regions, or spots, in the background layer are selected and converted to Bokeh spots by virtue of a Fast Fourier Transform (FFT) convolution. As to be described in greater detail below, the selected regions may correspond to bright spots in the background layer. At 204, the DOF effect produced by the blur operator and the Bokeh effect produced by the FFT are combined to achieve a resultant realistic looking image. Thereby, the resultant image advantageously presents a comprehensive depth-of-filed visual effect attributed to the Bokeh spots in a blurred background. In addition, because a diffusion blur approach or an FFT-based convolution may not dependent on the scene and camera parameters, the hybrid approach can maintain constant performance independent from these factors. For example during a game playing process, this feature can offer stability of the frame rate which is essential in modern games of many genres. Further, the hybrid approach can advantageously handle varying sizes of circles of confusion as well as highlighting proper Bokeh features o the scene effectively.

The original image and the resultant image may be 2D or 3D images. For purposes of practicing the present disclosure, the blurring techniques can involve any suitable algorithm or program configured to impart a blur effect on an image. In some embodiments, the blur operator includes a diffusion equation solver that generates Gaussian-blurs. Further, the present disclosure is not limited to any specific FFT convolution algorithm or program. For example, the FFT convolution may be based on a Cooley-Tukey algorithm, Prime-factor FFT algorithm, Bruun's FFT algorithm, Rader's FFT algorithm, etc. Specific feasible methods of computing various FFT convolutions or inverse FFT convolutions are well known in the art and can be used.

The method 200 can be implemented as a computer program. The modern graphic processing units (GPU) has evolved from a fixed function graphics pipeline to a programmable parallel processor with computing power that exceeds that of a multi-core central processing unit. Because FFT convolutions and diffusion blur operations are especially suitable for parallel processing, a GPU may offer a preferred platform due to its lightweight creation overhead and capability of running thousands of threads at full efficiency. However, it will be appreciated by those skilled in the art that method 200 can be also executed in a central processing units (CPU) as well.

As will be appreciated by those with ordinary skill in the art, the blurring operation and the Bokeh spots generation in accordance with the present disclosure can be independent of each other. Thereby the two steps 202 and 203 can be implemented in any order or simultaneously before their results are blended.

Figure 3:
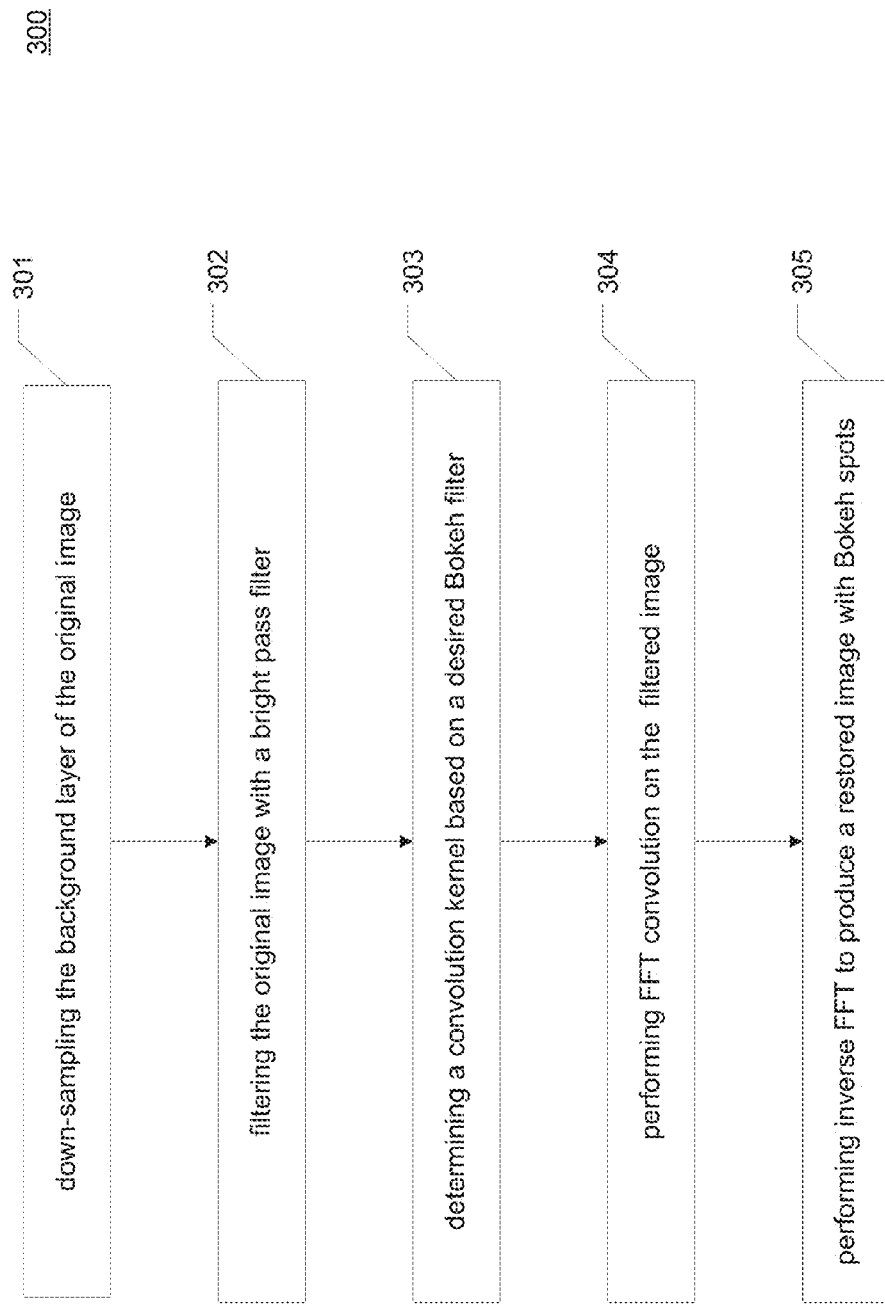
FIG. 3 is a flow chart depicting an exemplary compute implemented method of creating Bokeh spots in the background layer by use of FFT convolution in accordance with an embodiment of the present disclosure.

FIG. 3 is a flow chart depicting an exemplary computer implemented method 300 of creating Bokeh spots on an original image by use of FFT convolutions in accordance with an embodiment of the present disclosure. Method 300 is similar with block 202 in FIG. 2. In the illustrated embodiment, target spots to be converted correspond to bright pixels in the background layer. At 301, the background layer of the original image is optionally down-sampled to a lower resolution, and then further filtered with a bright pass filter in accordance with a programmable luminance threshold, e.g. specified by a user, at 302. In some other embodiments, the targeted regions to be converted to Bokeh spots may be selected based on any other aspect of the image data, or by any other filtering mechanism e.g. a color filter. At 303, a convolution kernel is determined based on a desired size and shape of the Bokeh spots to be achieved. At 304, the forward FFT convolution is performed with the convolution kernel on the selected regions in the background layer. Here the selected regions correspond to the bright pass filtered image. The FFT convolution converts the filtered image from the space domain to a frequency/phase domain. At 305, a corresponding inverse FFT is performed to restore the frequency/phase domain image to a space domain image which has Bokeh spots as a result of the FFT convolutions.

In some embodiments, the FFT and/or inverse FFT conversion operations can be implemented on a block-linear memory layout that caters for the fact that the input data is from the 2D-image domain. This memory layout change can advantageously and greatly improve the cache coherency of all memory accesses executed by the conversion algorithm Bokeh spots produced by a real-life camera usually echo the shape of the camera aperture which also determines the sizes of the Bokeh spots on the picture. In some embodiments, the sizes of the Bokeh spots may be specified by a user or varied according to a specified function. However it has been generally observed that Bokeh features produced by optical cameras typically are visible only at distant ranges and on the contrast bright parts of the image, regardless of the camera parameters used to take the image or the subject matter included, as illustrated in FIG. 1B. Moreover, the DOF circles of confusion tend to converge to a constant at distant ranges. These observations suggest Bokeh spots on the background layer can be characteristic of similar sizes or even the same size. Accordingly, in some other embodiments, a fixed convolution kernel may be uniformly applied for convolution on all the selected regions to be converted to Bokeh spots.

For example, the circle of confusion (CoC) at infinite distance can be used as the Bokeh spot size, e.g., $$\lim_{z \to \infty} \frac{a \cdot f \cdot (z - p)}{z \cdot (p - f)} = \frac{a \cdot f}{p - f},$$

where z is the distance of the pixels, a is the aperture capable of producing the desired Bokeh effect, f is the focal length of the image, and p is the distance of the pixels in focus.

Figure 4A:
FIG. 4A shows a sample original image.

FIG. 4A-4F are sample images produced during an exemplary process of creating a comprehensive DOF visual effect by use of the hybrid approach in accordance with an embodiment of the present disclosure. FIG. 4A is the example original image which may be a photograph taken with a camera, or a computer created graphic. In this example, the original image shows little DOF effect where the background and the foreground compete for a viewer's attention.

Figure 4B:
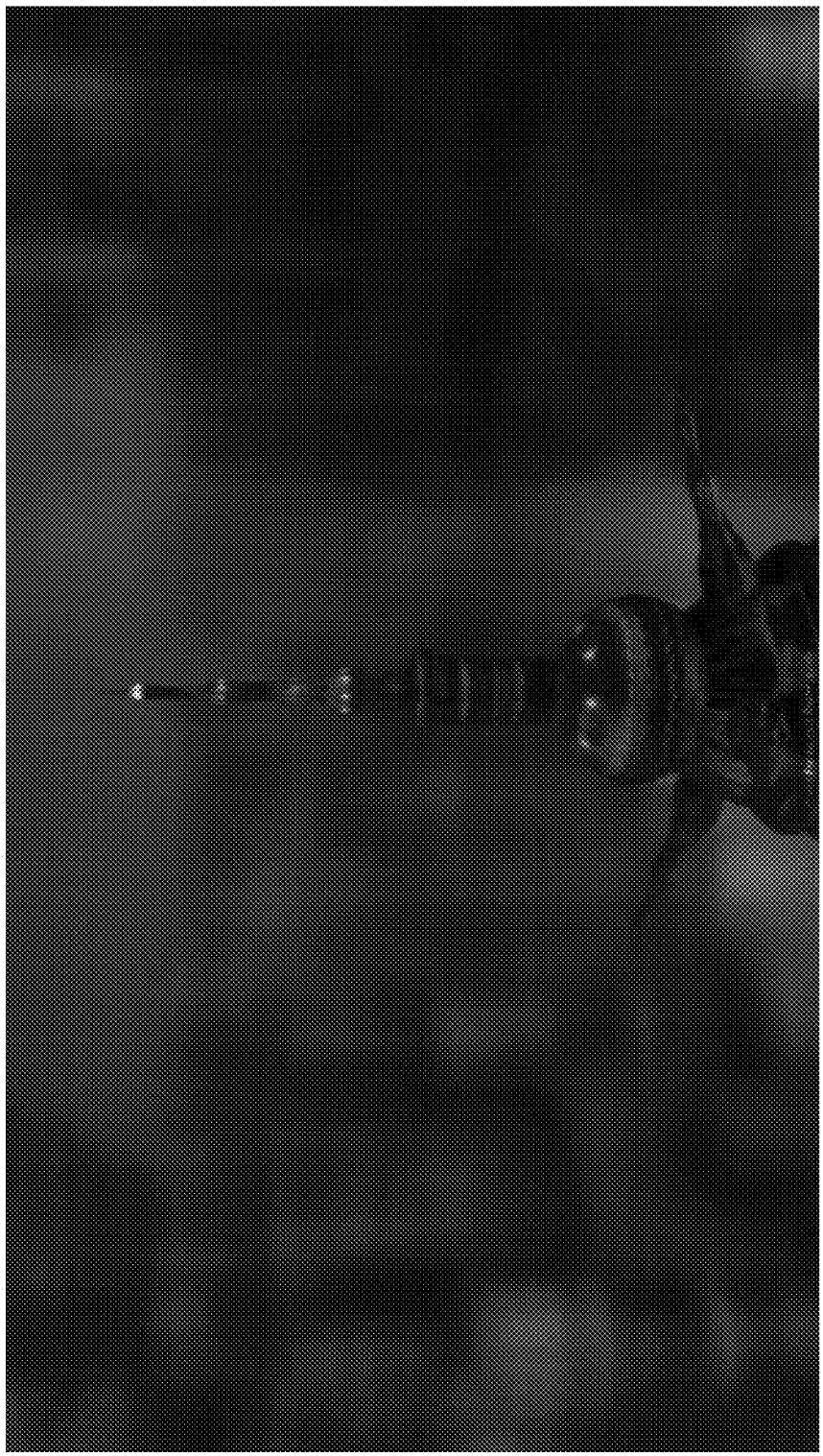
FIG. 4B illustrates an image resulted from a blurring operation performed on a background layer of the original image.

FIG. 4B illustrates an image resulted from a blur operation applied on a background layer of the original image. In the illustrated example, the foremost object is selected as the in-focus object to be emphasized by virtue of DOF effect. However, the distinction between the background and the in-focus objects can be flexibly defined in any manner, e.g. based on a cut-off distance with reference to a view point. In some embodiments, pixels in the background may be blurred in accordance with Gaussian functions to various extents, as described above with reference to FIG. 2 and FIG. 3.

Figure 4C:
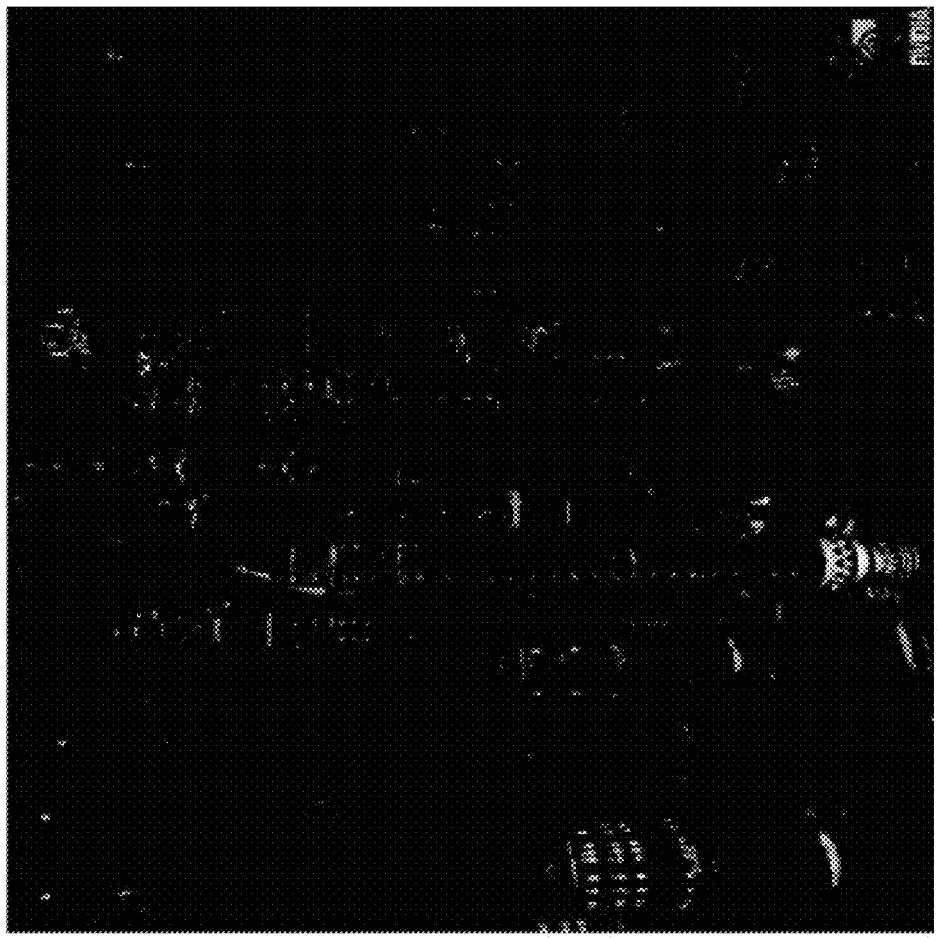
FIG. 4C illustrates an image resulted from down-sampling and bright pass filtering on the background layer of the original image.
Figure 4D:
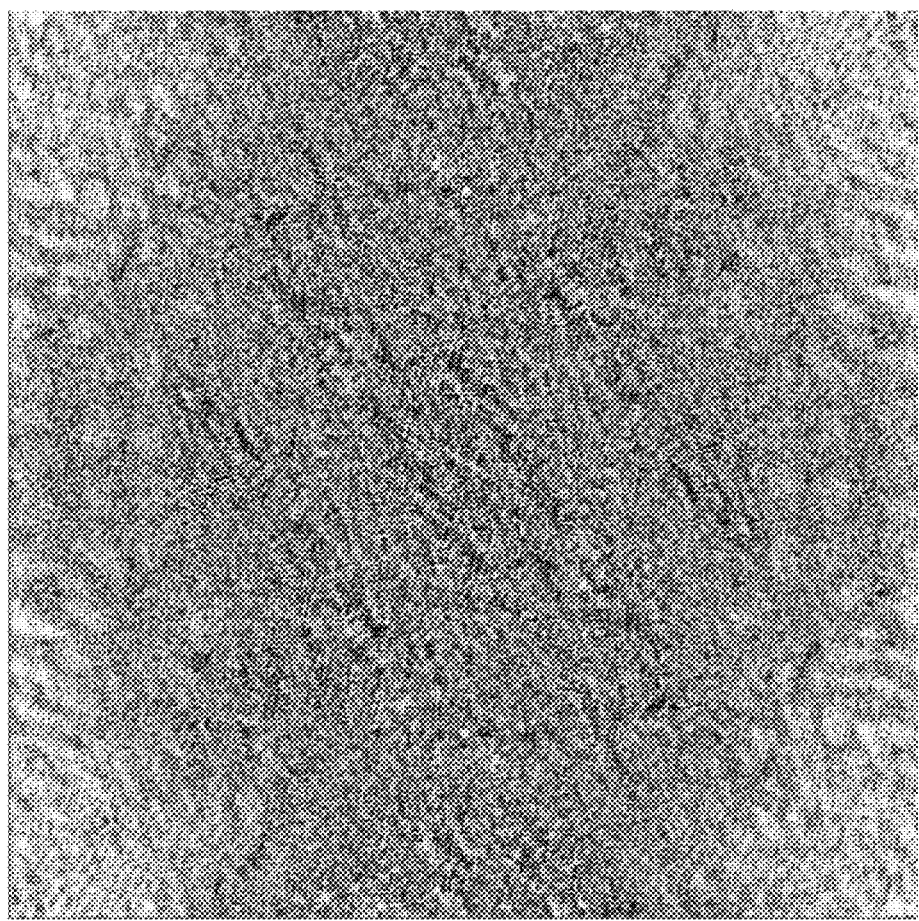
FIG. 4D illustrates a frequency domain image resulted from a forward FFT convolution performed on the image in FIG. 4C.
Figure 4E:
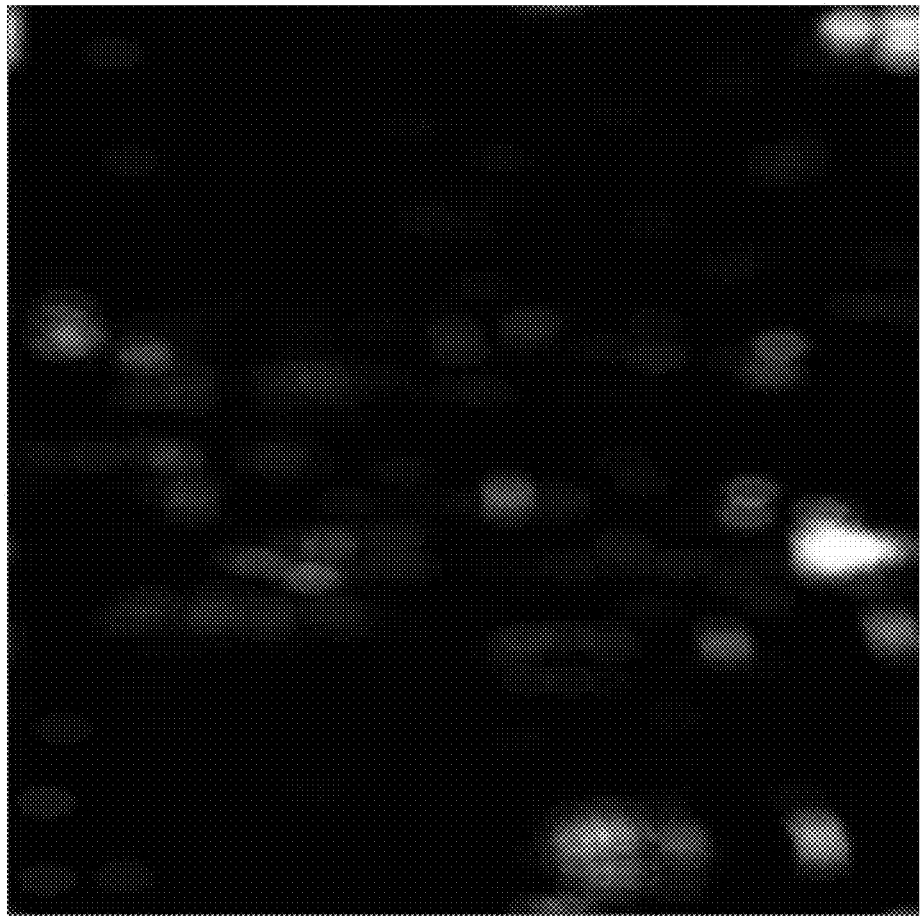
FIG. 4E illustrates a space domain image resulted from an inverse FFT convolution performed on the image shown in FIG. 4D.
Figure 4F:
FIG. 4F illustrates the final image resultant from blending the image with blurred background shown in FIG. 4B and the image with the Bokeh spots shown in FIG. 4E.

FIG. 4C illustrates an image resulted from down-sampling and bright pass filtering on the background layer of the original image. Thus, this image data only include the bright regions of background layer in a reduced resolution which facilitates fast convolution. In this example, the original image in FIG. 4A has a resolution of 1920×1200 pixels, while the down-sampled image has a resolution of 512×512 pixels. FIG. 4D illustrates a frequency domain image resulted from a forward FFT convolution performed on the image shown in FIG. 4C. FIG. 4E illustrates a space domain image resulted from an inverse FFT convolution performed on the image shown in FIG. 4D. Comparing to FIG. 4D, FIG. 4E demonstrates that the bright regions are blurred to a polygon shape which mimics real-life Bokeh spots in high fidelity. FIG. 4F illustrates the final image resultant from blending the image with blurred background in FIG. 4B and the image with the Bokeh spots in FIG. 4E. The blending operation can be performed in accordance with any technique that is well known in the art. Comparing to the original image in FIG. 4A, the final image presents a comprehensive depth-of-field effect that encompasses an emphasized subject and a gradually blurred background with the bright regions highlighted in a polygon shape, or the Bokeh effect.

Figure 5C:
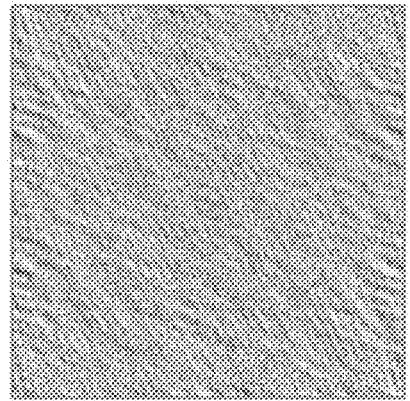
FIG. 5C illustrates that the frequency domain image and the frequency domain kernel are multiplied, or convoluted, based on a FFT algorithm, resulting an image similar with FIG. 4D.
Figure 5C:
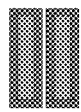
Figure 5C:
Figure 5C:
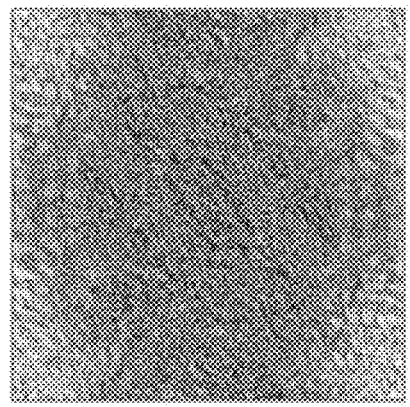

FIG. 5A-5C are sample images produced during an exemplary process of creating Bokeh spots by virtue of FFT convolutions in accordance with an embodiment of the present disclosure. FIG. 5A illustrates that an exemplary forward FFT transforms a filtered image from a space domain to a frequency domain. The image may be down-sampled for purposes of simplifying the FFT computation. FIG. 5B illustrates that the forward FFT transforms a polygon to a frequency domain kernel which is used as the convolution kernel. The polygon is selected based on the desired shape and size of the Bokeh spots to be generated. FIG. 5C illustrates that the frequency domain image and the frequency domain kernel are multiplied, or convoluted, based on a FFT algorithm, resulting an image similar with FIG. 4D.

Figure 6:
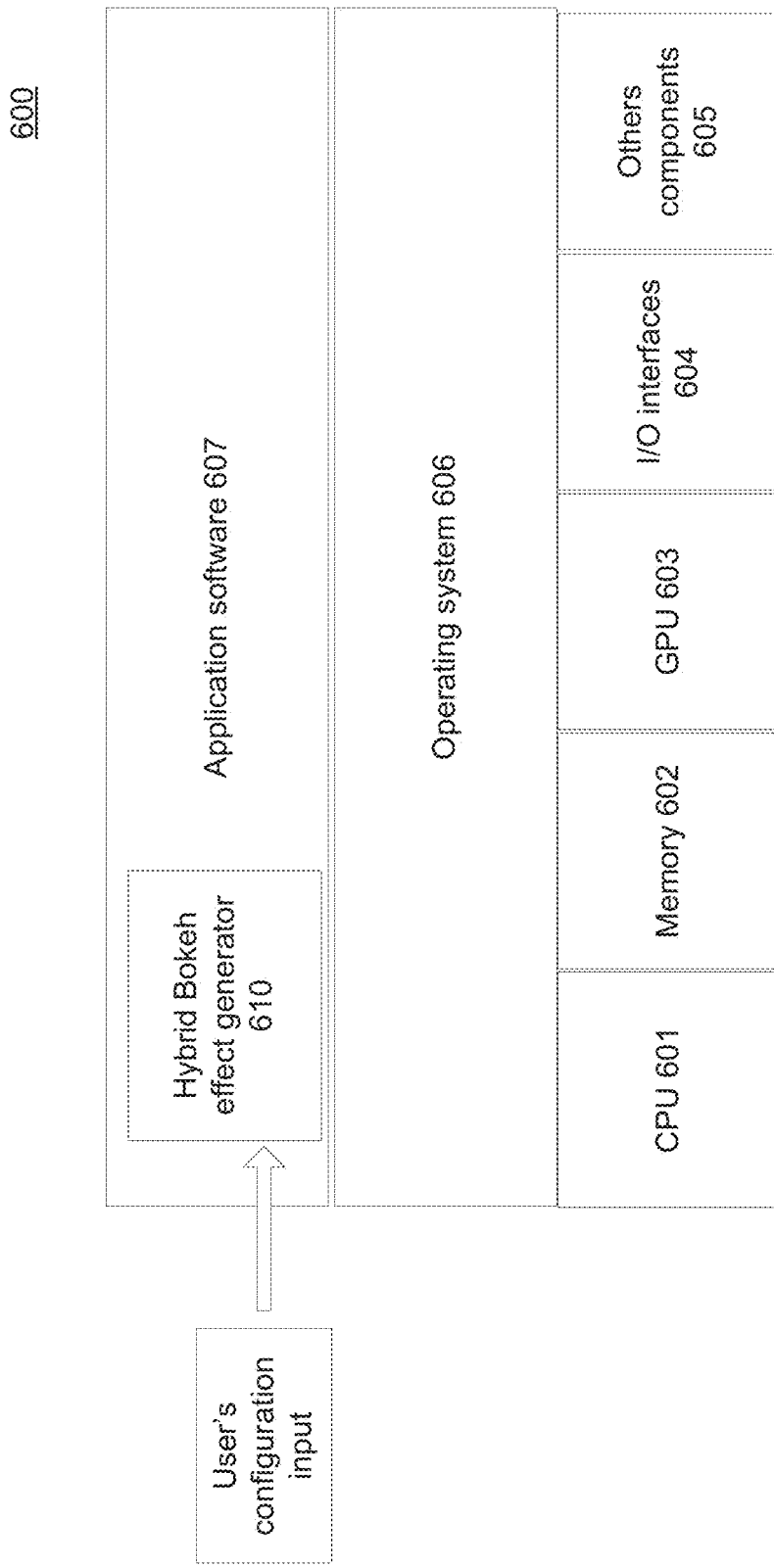
FIG. 6 is a block diagram illustrating a computing system including a depth-of-focus effect generator in accordance with an embodiment of the present disclosure.

FIG. 6 is a block diagram illustrating an exemplary computing system 600 including a depth-of-focus effect generator 610 in accordance with an embodiment of the present disclosure. The computing system comprises a processor 601, a system memory 602, a GPU 603, I/O interfaces 604 and other components 605, an operating system 606 and application software 607 including a depth-of-focus effect generator 610 stored in the memory 602. When incorporating the user's configuration input and executed by the CPU 601 or the GPU 603, the DOF effect generator 610 can produce a comprehensive DOF effect with Bokeh effect by using the hybrid approach in accordance with an embodiment of the present disclosure. The DOF effect generator 610 may include a diffusion solver, a bright pass filter, a sampler and a forward and inverse FFT convolution operator. The user configuration input may include an original image for processing, and Bokeh spot size and shape for example, as discussed with reference to FIG. 2 and FIG. 3. The hybrid Bokeh effect generator 610 may be an integral part of an image processing tool, a processing library, or a computer game that is written in Fortran, C++, or any other programming languages known to those skilled in the art.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A computer implemented method of rendering an image, the method comprising:
    accessing a first image represented in a space domain, said first image comprising a first section and a second section;
    applying a blur operator on said second section to generate a second image;
    identifying a plurality of target regions from said second section in said first image;
    converting said plurality of target regions from said space domain to a frequency domain by performing a convolution thereon;
    restoring said plurality of target regions in said first image from said frequency domain to said space domain to produce a third image; and
    blending said second image and said third image to produce a resultant image.

2. The computer implemented method of claim 1, wherein said converting and said performing a convolution comprises performing a Fast Fourier Transform (FFT) convolution on a convolution kernel with said plurality of target regions, and wherein said convolution kernel represents a hexagon camera aperture.

3. The computer implemented method of claim 2, wherein a size of said convolution kernel corresponds to a circle of confusion (CoC) at an infinite distance.

4. The computer implemented method of claim 2 further comprising configuring a plurality of execution threads to perform said FFT convolution in parallel.

5. The computer implemented method of claim 1, wherein said identifying said plurality of target regions comprises:
    down-sampling said first image to a downsized image;
    filtering said downsized image with a bright pass filter based on a configurable luminance threshold.

6. The computer implemented method of claim 1, wherein said first section corresponds to an in-focus subject represented in said first image, and wherein further said second section corresponds to a background represented in said first image.

7. The computer implemented method of claim 1, wherein said blur operator comprises a diffusion depth-of-field solver, and wherein further said resultant image comprises Bokeh effect components.

8. A system comprising
    a processor;
    a memory coupled to said processor and storing an image processing program, said image processing program comprising instructions that cause said processor to perform a method of generating an image, said method comprising:
        accessing a first image;
        identify a first portion and a second portion of said first image;
        selecting a plurality of regions from said second portion of said first image, said plurality of regions comprising luminous regions on said first image;
        performing a Fast Fourier Transform (FFT) convolution on said plurality of regions with a convolution kernel representing a geometric shape to produce an intermediate image;
        performing an inverse FFT convolution on said intermediate image to produce a second image;

applying a blur operator on said second portion of said first image and preserving said first portion to produce a third image; and combining said second image and said third image to produce a resultant image.

9. The system of claim 8, wherein said blur operator comprises a diffusion depth-of-field (DOF) solver, and wherein said resultant image presents a Bokeh effect.

10. The system of claim 8, wherein said Fast Fourier Transform (FFT) convolution converts said plurality of regions from a space domain to a frequency domain, and wherein said convolution kernel represents a camera aperture shape with a size equal to a circle of confusion (CoC) at an infinite distance of said first image.

11. The system of claim 8, wherein said selecting said plurality of regions comprises: down-sampling said second portion of said first image to a reduced-resolution image, and applying a bright pass filter on said reduced-resolution image based on a luminance threshold.

12. The system of claim 8, wherein said method further comprises configuring a plurality of execution threads to perform said FFT convolution and said inverse FFT convolution respectively in parallel.

13. The system of claim 8, wherein said first portion corresponds to an in-focus subject, and wherein said second portion corresponds to a background.

14. A non-transitory computer-readable storage medium comprising instructions, when executed by a processor, cause the processor to implement a method of generating an image, said method comprising:

accessing a first image;

identify a first portion and a second portion of said first image;

selecting a plurality of regions from said second portion of said first image, said plurality of regions comprising luminous regions on said first image;

performing a Fast Fourier Transform (FFT) convolution on said plurality of regions with a convolution kernel representing a geometric shape to produce an intermediate image;

performing an inverse FFT convolution on said intermediate image to produce a second image;

applying a blur operator on said second portion of said first image and preserving said first portion to produce a third image; and combining said second image and said third image to produce a resultant image.

15. The non-transitory computer-readable storage medium of claim 14, wherein said blur operator comprises a diffusion depth-of-field (DOF) solver, and wherein said resultant image presents a Bokeh effect.

16. The non-transitory computer-readable storage medium of claim 14, wherein said Fast Fourier Transform (FFT) convolution converts said plurality of regions from a space domain to a frequency domain.

17. The non-transitory computer-readable storage medium of claim 14, wherein said selecting said plurality of regions comprises: down-sampling said second portion of said first image to a reduced-resolution image, and applying a bright pass filter on said reduced-resolution image based on a luminance threshold.

18. The non-transitory computer-readable storage medium of claim 14, wherein said method further comprises configuring a plurality of execution threads to perform said FFT convolution and said inverse FFT convolution respectively in parallel.

19. The non-transitory computer-readable storage medium of claim 14, wherein said first portion corresponds to an in-focus subject represented in said first image, and wherein said second portion corresponds to a background represented in said first image.

20. The non-transitory computer-readable storage medium of claim 14, wherein said convolution kernel represents a camera aperture shape with a size equal to a circle of confusion (CoC) at an infinite distance of said first image.

* * * * *